US007553232B2

(12) United States Patent
Kelley et al.

(10) Patent No.: US 7,553,232 B2
(45) Date of Patent: Jun. 30, 2009

(54) SYSTEM AND METHOD FOR PREDICTING RESULTS OF CHANCE EVENTS OVER A USER-SELECTED NUMBER OF EVENTS

(75) Inventors: Edward E. Kelley, Wappingers Falls, NY (US); Laurence E. Cunningham, Lane Cove (AU)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/711,316

(22) Filed: Sep. 10, 2004

(65) Prior Publication Data

US 2006/0058094 A1 Mar. 16, 2006

(51) Int. Cl.
*A63F 9/24* (2006.01)
*A63F 13/00* (2006.01)

(52) U.S. Cl. ............................ 463/22; 463/16; 463/21; 463/25

(58) Field of Classification Search ............ 463/16–22, 463/4, 6, 25–28
See application file for complete search history.

(56) References Cited

U.S. PATENT DOCUMENTS

| | | | | |
|---|---|---|---|---|
| 4,695,053 | A * | 9/1987 | Vazquez et al. | 463/18 |
| 4,875,164 | A | 10/1989 | Monfort | |
| 5,702,303 | A | 12/1997 | Takemoto et al. | |
| 5,797,796 | A * | 8/1998 | Dickinson | 463/43 |
| 6,068,552 | A * | 5/2000 | Walker et al. | 463/21 |
| 6,099,409 | A * | 8/2000 | Brenner et al. | 463/40 |
| 6,227,969 | B1 * | 5/2001 | Yoseloff | 463/13 |
| 6,270,409 | B1 | 8/2001 | Shuster | |
| 6,293,868 | B1 * | 9/2001 | Bernard | 463/42 |
| 6,325,721 | B1 * | 12/2001 | Miyamoto et al. | 463/40 |
| 6,394,895 | B1 * | 5/2002 | Mino | 463/3 |
| 6,523,829 | B1 * | 2/2003 | Walker et al. | 273/292 |
| 6,540,230 | B1 * | 4/2003 | Walker et al. | 273/292 |
| 6,554,708 | B1 * | 4/2003 | Brenner et al. | 463/40 |
| 6,554,709 | B1 * | 4/2003 | Brenner et al. | 463/42 |
| 6,602,136 | B1 * | 8/2003 | Baerlocher et al. | 463/16 |
| 6,666,763 | B2 * | 12/2003 | Kawamura et al. | 463/6 |
| 6,764,395 | B1 * | 7/2004 | Guyett | 463/9 |
| 6,773,350 | B2 * | 8/2004 | Yoshimi et al. | 463/42 |
| 6,893,342 | B1 * | 5/2005 | Singer et al. | 463/20 |
| 7,089,250 | B2 * | 8/2006 | Doganata et al. | 707/100 |
| 7,229,354 | B2 * | 6/2007 | McNutt et al. | 463/29 |
| 7,291,070 | B2 * | 11/2007 | Gatto et al. | 463/42 |
| 7,306,514 | B2 * | 12/2007 | Amaitis et al. | 463/6 |
| 2001/0031656 | A1 * | 10/2001 | Marshall et al. | 463/6 |
| 2002/0198044 | A1 * | 12/2002 | Walker et al. | 463/25 |
| 2003/0119570 | A1 * | 6/2003 | Maroun | 463/6 |
| 2003/0176218 | A1 | 9/2003 | LeMay et al. | |
| 2003/0176220 | A1 | 9/2003 | Baerlocher | |
| 2003/0195841 | A1 | 10/2003 | Ginsberg et al. | |
| 2007/0087825 | A1 * | 4/2007 | Hart et al. | 463/28 |
| 2007/0106553 | A1 * | 5/2007 | Jordan et al. | 705/14 |

FOREIGN PATENT DOCUMENTS

| | | | |
|---|---|---|---|
| GB | 2092342 | A * | 8/1982 |

* cited by examiner

*Primary Examiner*—John M Hotaling, II
*Assistant Examiner*—Steven J. Hylinski
(74) *Attorney, Agent, or Firm*—Jay Anderson; Ron Kaschak; Daryl Neff

(57) ABSTRACT

A method, a system, and a recording medium are provided herein by which a user selects a number of a plurality of events for which an outcome of each event is not known to the user. A predicted result is then automatically indicated to the user based on a probability that a predetermined outcome will occur among the user-selected number of events.

16 Claims, 3 Drawing Sheets

SYSTEM AND METHOD FOR PREDICTING RESULTS OF CHANCE EVENTS OVER A USER-SELECTED NUMBER OF EVENTS

BACKGROUND OF INVENTION

The invention relates to event outcome prediction systems, and more specifically to a system and method for predicting and indicating results of chance events over a user-selected number of events.

Probability theory is applicable to all branches of science. Probability and the related field of statistics have long been used to predict the outcomes of events, whether the events are to occur in the future, or the events occurred in the past, but with still undetermined outcomes. In the past, probabilities were calculated by persons skilled in mathematics, using no tools to perform the calculations other than paper and pencil. Recently, the advent of computers has allowed probability and statistics to be used more widely than before because of the ease with which such calculations can now be performed. Recently, there has been much interest in automated systems and processes that predict the outcomes of events that are determined or influenced by chance.

However, the particular tasks to which probability theory is applied and the way it is applied are not ordinary problems to be solved. Of particular interest is the ability to calculate the probability that a predetermined outcome will occur among a plurality of randomly determined outcomes of a plurality of events. The probability that an event will result in a predetermined outcome can be expressed as a fraction or decimal value between 0 and 1, where 0 indicates no probability that the predetermined outcome will occur, and 1 indicates the opposite; i.e., 100% probability that the predetermined outcome will occur. For example, when a pair of dice is rolled the likelihood that the dice will land with the number four appearing on the top face of at least one of the dice can be calculated as a fraction relating the predetermined outcome to the set of all possible outcomes. For each die, since the number four is one of six different possible outcomes, the probability is ⅙, i.e., 0.167. However, since two dice are rolled, and each roll of a die is an independent event, the probability that a four appears on the top face of the second die is also ⅙, i.e., 0.167. When the rolls of the two dice are considered together, the probability of a four appearing on the top face of at least one of the dice is simply the added probabilities that a four will appear on each one of the dice, namely: $P=0.167+0.167=0.333$, which is equivalent to the fraction ⅓. On the other hand, if one desires instead to determine the probability that a four appears on the top faces of both dice when rolled, the problem now requires that the calculated probability of the four appearing on the first die, i.e., 0.167, be multiplied by the calculated probability that the four appears on the second die, i.e., 0.167, since it is desired to determine that subset of the outcomes in which both the first and second dice present the number four on the top face. Thus, the probability that the number four appears on the top faces of both of the dice when the pair of dice is rolled becomes $0.167\times0.167=0.028$, which is equivalent to the fraction $1/36$.

Sometimes, some outcomes of an event occur with greater frequency than others. For example, among the various combinations of numbers which can occur upon rolling a pair of dice, the number seven occurs most frequently, because the number seven can be produced by the most number of combinations. Specifically, seven is produced by six combinations appearing on the dice, i.e., 1+6, 2+5, 3+4, 4+3, 5+2, and 6+1. However, other numbers occur less frequently on a roll of the dice because they are produced by only one or a few combinations. For example, the numbers two and twelve are produced only by the dice combinations 1+1, and 6+6, respectively.

Certainly, as the number of events increases and the number of different combinations of events increases that can produce a particular outcome, it becomes more difficult to estimate the likelihood of a desired result from a plurality of events whose outcomes are randomly determined. Particularly, with respect to events that are at least influenced by chance, e.g., results of an investment portfolio over a period of time, it would be desirable to indicate to a user the predicted results of a particular strategy, given assumptions concerning the chances of succeeding, i.e., an assessment of the investment risks.

SUMMARY OF INVENTION

According to an aspect of the invention, a method is provided by which a user selects a number of a plurality of events for which an outcome of each event is not known to the user. A predicted result is then automatically indicated to the user based on a probability of a predetermined outcome occurring among the user-selected number of events.

According to a preferred aspect of the invention, the user is permitted to select a time point in a future sequence of the events at which a desirable result is predicted. An account for the user is credited with a first amount according to the desirable result selected by the user. The user is then permitted to utilize the first amount for determining outcomes of events. After a minimum number of events have occurred, the user is permitted to utilize a second amount in the account, remaining from the first amount, for a purpose other than determining outcomes of events, e.g., to withdraw the second amount as cash.

According to yet another aspect of the invention, a system is provided which is operable to permit a user to select a number of events for which an outcome is not known to the user. The system is further operable to automatically indicate a predicted result to the user based on a probability of a predetermined outcome among the user-selected number of events.

According to yet another aspect of the invention, a recording medium is provided having instructions recorded thereon for performing a method, wherein the method allows a user to select a number of events for which the outcome is not known to the user. A predicted result is automatically indicated to the user based on a probability of occurrence of a predetermined outcome among the user-selected number of events.

DETAILED DESCRIPTION

Accordingly, in the embodiments of the invention described herein, a method is provided for indicating to a user a representation of the future, taking into account the results of outcomes of events at least partly determined by chance. In particular embodiments of the invention, the user is permitted to select for display the outcomes of a range of events, e.g., a set of events between two points in time, for which a desirable result is achieved.

Particularly for certain applications, e.g., in the provision of games and/or running of other nondeterministic events, such as horse races, etc., by a casino or other facility, an embodiment of the invention displays numerically and/or graphically, the results of events in a way which better informs the user about the nature of a bet he may wish to place. Accordingly, for one embodiment of the invention, it would be desirable for a casino or other gaming facility to allow a player to select a particular range of events and be provided a set of predicted results according to the chances that desired predetermined outcomes appear for the selected set of events.

Figure 1:
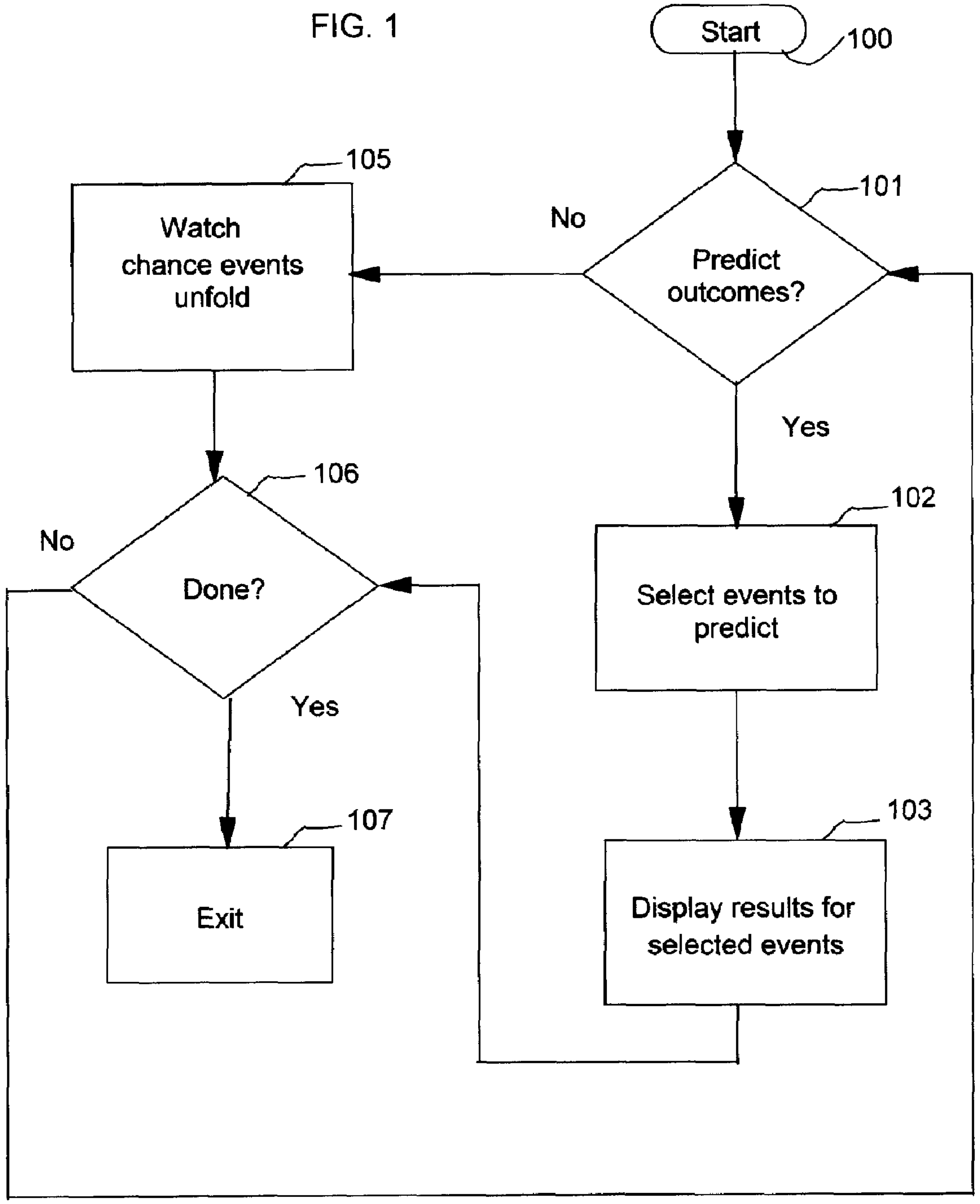
FIG. 1 is a flow chart illustrating a method according to a first embodiment of the invention.

The embodiments of the invention described herein are applicable to predicting the results of chance events in a variety of fields. A method according to an embodiment of the invention is illustrated in FIG. 1. As shown therein, a starting point in such method is provided at block 100. At block 101, the user is asked whether he wishes to see a prediction of the outcomes of a set of events, the events being at least partly determined by chance. In one embodiment, the set of events are a large number of events which share a common theme. For example, the set of events can be the future rates of returns on particular types of investments, e.g, for investment portfolio planning, as well as other related events such as the future rate of inflation and applicable future tax rates. As outcomes of the events, the various possible future rates of returns, future inflation rates, and future tax rates are provided, together with an assessment as to the likelihood that each particular rate will occur. In another example, the set of events can be attempts at finding a valuable underground mineral deposit, or discovering a new pharmaceutical compound, given a set of inputs and assumptions which determine the probability of success on any given attempt. While chance events affecting the success of an investment portfolio are generally ordered sequentially in time, the chance events relating to the discovery of a mineral deposit or pharmaceutical compound might not be. For example, in the case of exploring for a mineral deposit, chance events may be ordered spatially rather than by time, like points on a map by which successful attempts permit one to home in on the location of a sought after mineral deposit.

If the user answers "No" at block 101, at block 105, the user watches for chance events to unfold as they occur. However, when the user answers "Yes" at block 101, the user is provided the results of simulating the occurrence of the chance events in a way which reflects the probabilities of the various outcomes of the set of events. In one embodiment, the results are plotted graphically so that the user is given a picture at each relevant point, e.g., point in time, or point in space, of the effect of chance events on the outcome. Such graphical plot includes points at which a number of "bad outcomes" of events negatively affects the overall result, as well as other points at which a number of "good outcomes" of events produces a desirable result. At block 102, the user is given an opportunity to select from the simulated results a subset of the chance events which produce a result desirable to the user. Generally, this involves the user selecting a range of events, especially a time range for time sequentially ordered events, in which results are favorable. For example, in one embodiment, the user is given a chance to select two points in time and view the results possible for chance events occurring between the two points in time. Thus, the user who uses the tool to predict the success of an investment portfolio can select to display results for particular periods of time in which extra needs are present, e.g., when a child leaves home for college, or when retirement looms on the horizon. In another embodiment in which a mineral deposit is sought after, the results are displayed in spatial relation to each other for a selected number of attempts.

Thereafter, at block 103, the results of the particular selected events are displayed to the user. At block 106, it is then determined whether the user has finished utilizing the event outcome prediction method according to the invention. If the user indicates "Yes", the method concludes, as shown at 107. However, if the user has not finished, the method continues again from block 101, as described above.

A particular embodiment of the invention is applied to a slot machine of a casino for the purpose of indicating to the player the chances that a winning result will occur in the future. In one embodiment of the invention, the method is implemented by a computing device or program in the slot machine, or through a separate unit in communication with the slot machine, such as a separate server or a smart card. Playing a slot machine requires no particular skills and the chance of a winning result is determined entirely randomly. While each casino generally has several different types of slot machines available to players, there is no way for the casino to differentiate its own slot machines made by one manufacturer from those at another casino which are made by the same manufacturer. Slot machines that are currently operated in various casinos provide little information to help the player favor one slot machine over another. A particular casino, interested in differentiating itself from competitors, can provide slot machines according to this embodiment of the invention to increase the attraction of its slot machines.

According to this embodiment of the invention, players are provided a way to favor the slot machines of one casino over those of other casinos by allowing the player, for example, for a fee, a choice of seeing predicted future results of playing the slot machine. In a particular embodiment, the player is allowed to select a future point in time and have an account credited with winnings that he would have obtained by playing up to that point in time. The player may then utilize the "winnings" for additional play at the slot machine. At the same time, steps are taken to assure that the casino maintains its winning advantage prior to the player being able to utilize the winnings for purposes other than additional play.

Figure 2:
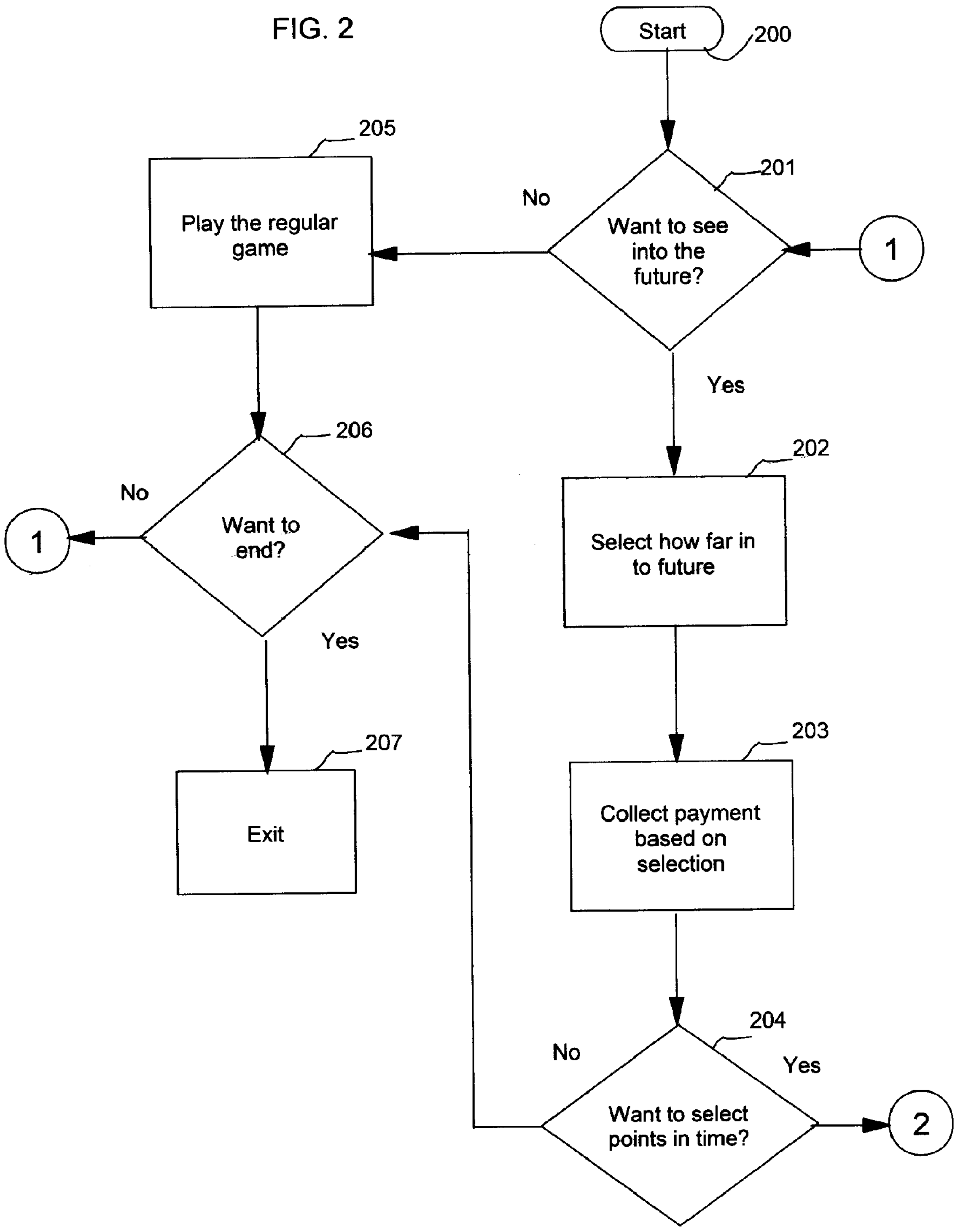
FIGS. 2 and 3 are respective portions of a flow chart illustrating a method according to a second embodiment of the invention.
Figure 3:
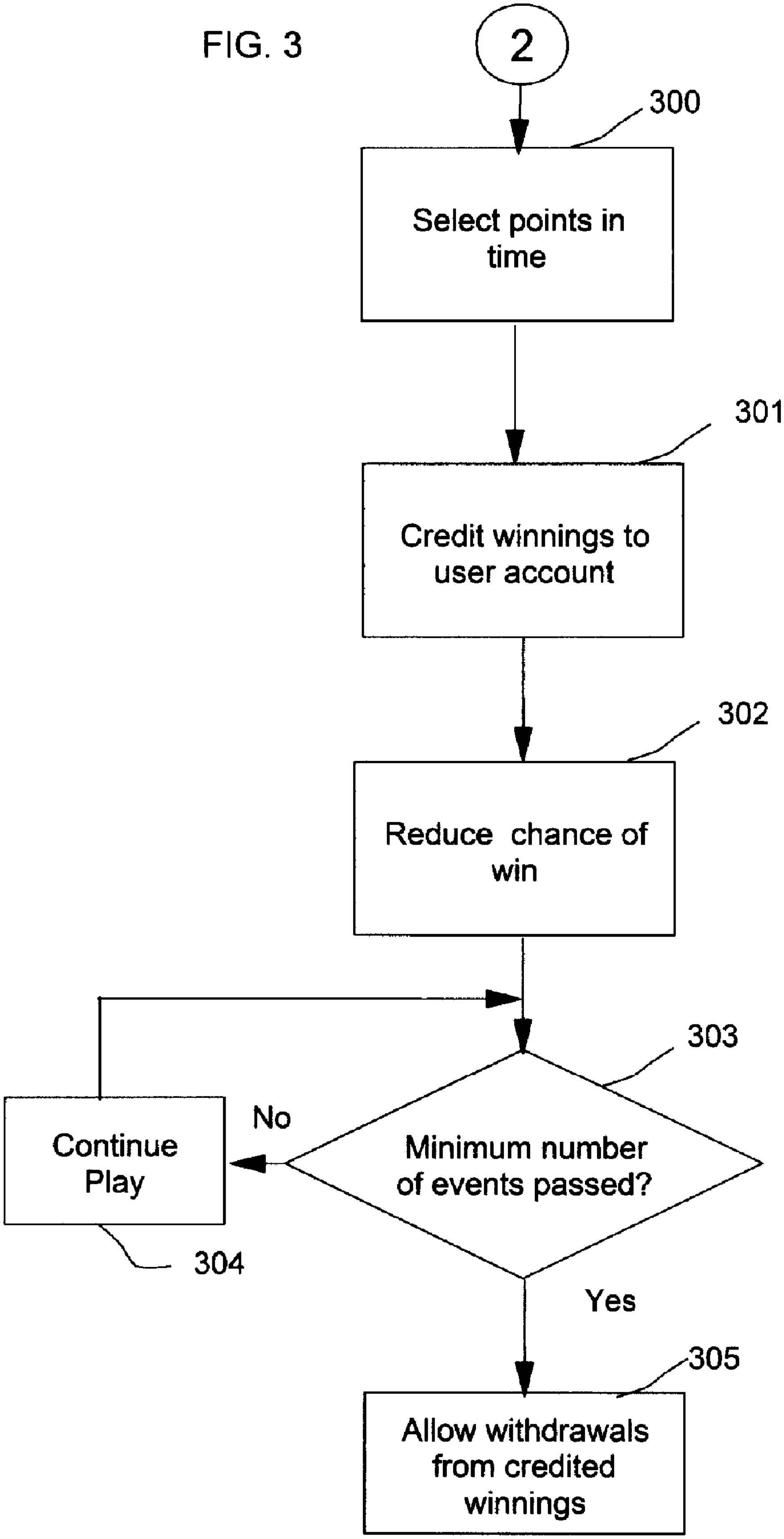

FIGS. 2 and 3 are a flow chart illustrating an embodiment of the invention as applied to a slot machine. In FIG. 2, the start of the game on the slot machine is indicated at 200. At block 201, the player is given an option of "seeing into the future", i.e., of predicting the results of future game play. If the player decides "No", the player then plays the regular game, as indicated at block 205. Regular game play then proceeds until block 206, at which the player can decide to stop and exit game play (block 207). Alternatively, the player can decide to continue playing, which returns the player to decision block 201. Thus, whenever the player decides to end regular game play, but has not decided yet to end play altogether, the player is given the option of either selecting to play another regular game or predicting the results of future game play.

On the other hand, at the beginning of game play and at other times during game play, the player is given an option of seeing predicted future game results. Here, the player is given a choice to "select how far into the future," i.e., to select a range of time in for obtaining predicted results of future game play. When the predicted results are to be displayed by time, they will be based on an assumption that the player makes a given number of attempts at success per unit time. Here, the player may decide to select a shorter or longer range of time, depending upon how much time the player wishes to spend at the casino and how must money the player wishes to place at risk per each attempt at success in the game.

The program or interface is desirably customized in relation to the usage and preferences of the casino, the player, and perhaps, the type of service selected. For example, different fee structures can be established and selected by the player and the casino to provide more or less options, and to present particular points in time for selection by the player. For example, one option could allow the player to choose a certain point in time, such as the actual time that is 20 minutes from the present. Alternatively, another option could allow the player to select a point in time indirectly by selecting the number of attempts at success to be made, e.g., by seeing predicted results for a point in time at which 20 attempts at success have been made.

In particular embodiments, the player must choose to see simulated results within a certain time limit, for example, 20 minutes, or within a maximum number, e.g., 50 attempts at success. Placing limits on the time or number of attempts at success to be displayed for the game may help to keep the game interesting by preserving the more distant results of future play unknown.

At block 203, a payment is collected from the player in accordance with the selection, e.g., by insertion of additional coins or tokens, or perhaps payments from a credit or debit card into the slot machine. In return, the slot machine or other cooperating apparatus attached to the slot machine displays the simulated, i.e., predicted results of continued play on the slot machine to the player. In one embodiment, a graph showing the results of "n" attempts at success is displayed to the player. Such results display can be provided, for example, by generating random numbers biased to duplicate a game, while preserving the advantage to the casino. A graph would show the position of the player with respect to the casino, in terms of the money wagered, and the money lost or gained for every attempt at success, in the predicted results of future play on the slot machine.

At block 204, the player is asked whether he wishes to select a point in time, e.g., a point in time when the player would be most ahead of the casino, and then have the money credited to him. If the player decides "No", i.e., decides not to take this option, at block 206 the player is asked whether he wants to end the game. If the player does not want to end, but wants to continue, the method continues again at block 201 as before. However, if the player does want to end the game now, game play then exits at block 207.

On the other hand, when the player decides to select a point in time, the method continues at block 300 of FIG. 3. As shown in FIG. 3, the player selects one or more points in time at which a desirable result is obtained. For example, a point in simulated future game play is selected at which the player is ahead of the casino by 30%. At block 301, the player can then choose to have the "winnings" of the simulated game play credited to an account held by the casino for the player. The "winnings" are then deposited into the player's account. However, while the "winnings" appear in the player's account now, the player is not able to access and withdraw money just yet against the "winnings".

As further shown at block 303, since the customer is now playing with the casino's money, a minimum number of events (e.g., the number of attempts made at winning) must pass before the player is allowed to collect winnings. Thus, at block 303, a determination is made whether the player has made the sufficient number of attempts at success after being credited with the "winnings", and if the player has not, the player must continue play before he can withdraw the amount remaining from the credited winnings, as shown at block 304. Optionally, as shown at 302, the probability of winning on any particular event is reduced, i.e., the chance of winning on any one attempt on the slot machine is decreased from what it was before. In such embodiment, the chance of winning is reduced in accordance with the amount of winnings that are credited to the user's account and how many additional attempts to win will be required before the user can access the credited winnings for other purposes, e.g., to withdraw what remains of the credited winnings from the user's account. The purpose of temporarily decreasing the player's chance of winning and requiring a minimum number of attempts is to maintain the advantage held by the casino at a level reflecting the advantage held by the casino for the original game.

Finally, once the minimum number of events has passed, the answer at decision block 303 becomes "Yes". Accordingly, as shown at block 305, the player is now permitted to withdraw the part remaining from the credited winnings in the account for a different purpose, for example, as regular money that to be spent in whatever manner the player chooses.

Alternatively, without decreasing the chance of winning on each individual game attempt, the player can be given the option of playing for an even longer period of time, i.e., for a greater number of attempts to win, before being permitted to withdraw the remaining part of the previously credited winnings. This option may be advantageous for the casino to offer during slow periods, in order to attract players having smaller amounts of money to the game. However, in very busy periods, the casino may choose not to provide an option for the player to play longer according to the original chance of winning, but instead offer only the decreased chance of winning. In one embodiment, the decision of whether to offer the option of playing according to the original chance of winning and require a greater number of play attempts is made automatically in view of the number of slot machines available at the particular point in time, the particular time of day (e.g., from which a prediction is made concerning the number of players who are expected to play shortly), and any other relevant factors which may influence the demand for playing the particular type of slot machine on the particular day.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method, comprising:

(a) displaying a plurality of sequentially ordered events by a machine and permitting a player to select a range including a fewer number of the sequentially ordered events from among the displayed plurality of sequentially ordered events, for each event of which an outcome is determined at least partly by chance and is as yet not known to the player;

(b) prior to determining actual outcomes of the events, simulating the outcomes of each of the sequentially ordered events in the range by the machine based on a probability that a predetermined outcome will occur and automatically indicating by the machine to the player predicted winnings based on a (j) first (i=1)th predicted result of simulating the outcome of a first (i=1)th one of the events, and, (jj) for each of the plurality of events from a second (i=2)th event to an nth (i=n) event, an ith predicted result of simulating the outcome of an ith event accumulated with the (i−1)th result, wherein the (i−1)th result simulates the outcome of an (i−1)th event accumulated with any (i−2)th result, if any (i−2)th result exists;

(c) permitting the player to select one of the predicted results from among the predicted first through nth results indicated by the machine;

(d) indicating by the machine that an account is credited for the player with predicted winnings according to the player-selected predicted result;

(e) permitting the player by the machine to utilize the predicted winnings to determine actual outcomes of at least some of the events and adjusting an amount in the account based on the actual outcomes; and (f) after the actual outcomes of a minimum number of the events have been determined, permitting the player by the machine to retain the adjusted amount in the account as actual winnings.

2. The method as claimed in claim 1, wherein step (f) includes decreasing a probability that the predetermined outcome will occur per each individual event until the actual outcomes of at least a minimum number of the events have been determined.

3. The method as claimed in claim 1, further comprising collecting a payment from the player prior to the step of automatically indicating the predicted results to the player.

4. The method as claimed in claim 3, wherein the number of the plurality of events is selected by the player and the amount of the payment collected from the player varies according to the selected number of events.

5. The method as claimed in claim 1, wherein the time sequentially ordered events occur in the player playing of one or more games of chance.

6. The method as claimed in claim 1, further comprising providing the account to the player by an operator of the one or more games of chance, and permitting the player to withdraw the actual winnings from the account after the minimum number of events have occurred.

7. The method as claimed in claim 6, wherein the one or more games of chance are provided by an operator of a casino and the player is a player with respect to the casino.

8. The method as claimed in claim 7, wherein the one or more games of chance are played on a slot machine of the casino.

9. The method as claimed in claim 1, wherein the predicted first through nth results are indicated graphically to the player.

10. A machine operable to perform a method, the method including the steps of:

(a) displaying a plurality of sequentially ordered events by the machine and permitting a player to select a range including a fewer number of the sequentially ordered events from among the displayed plurality of sequentially ordered events, for each event of which an outcome is determined at least partly by chance and is as yet not known to the player;

(b) prior to determining actual outcomes of the events, simulating the outcomes of each of the sequentially ordered events in the range by the machine based on a probability that a predetermined outcome will occur and automatically indicating by the machine to the player predicted winnings based on a (j) first (i=1)th predicted result of simulating the outcome of a first (i=1)th one of the events, and, (jj) for each of the plurality of events from a second (i=2)th event to an nth (i=n) event, an ith predicted result of simulating the outcome of an ith event accumulated with the (i−1)th result, wherein the (i−1)th result simulates the outcome of an (i−1)th event accumulated with any (i−2)th result, if any (i−2)th result exists;

(c) permitting the player to select one of the predicted results from among the predicted first through nth results indicated by the machine;

(d) indicating by the machine that an account is credited for the player with predicted winnings according to the player-selected predicted result;

(e) permitting the player to utilize the predicted winnings in exchange for determining actual outcomes of at least some of the events and adjusting an amount in the account based on the actual outcomes; and (f) after the actual outcomes of a minimum number of the events have been determined, permitting the player to retain the adjusted amount in the account as actual winnings.

11. The system as claimed in claim 10, wherein the system is further operable, upon crediting the account, to decrease a probability that the predetermined outcome will occur per each individual event until at least the actual outcomes of the minimum number of events have been determined.

12. The system as claimed in claim 10, wherein the system is further operable to provide the account to the player from an operator of one or more games of chance, and permit the player to withdraw the actual winnings from the account after the actual outcomes of the minimum number of events have been determined.

13. The system as claimed in claim 12 wherein the device includes a slot machine.

14. The system as claimed in claim 10, wherein the device includes a computing device, a server or a slot machine.

15. A recording medium having computer-readable instructions recorded thereon, the instructions being executable by machine to perform a method including the steps of:

(a) displaying a plurality of sequentially ordered events by a machine and permitting a player to select a range including a fewer number of the sequentially ordered events from among the displayed plurality of sequentially ordered events, for each event of which an outcome is determined at least partly by chance and is as yet not known to the player;

(b) prior to determining actual outcomes of the events, simulating the outcomes of each of the sequentially ordered events in the range by the machine based on a probability that a predetermined outcome will occur and automatically indicating by the machine to the player predicted winnings based on a (j) first (i=1)th predicted result of simulating the outcome of a first (i=1)th one of the events, and, (jj) for each of the plurality of events from a second (i=2)th event to an nth (i=n) event, an ith predicted result of simulating the outcome of an ith event accumulated with the (i−1)th result, wherein the (i−1)th result simulates the outcome of an (i−1)th event accumulated with any (i−2)th result, if any (i−2)th result exists;

(c) permitting the player to select one of the predicted results from among the predicted first through nth results indicated by the machine (d) indicating by the machine that an account is credited for the player with predicted winnings according to the player-selected predicted result;

(e) permitting the player to utilize the predicted winnings in exchange for determining actual outcomes of at least some of the events and adjusting an amount in the account based on the actual outcomes; and (f) after the actual outcomes of a minimum number of the events have been determined, permitting the player to retain the adjusted amount in the account as actual winnings.

16. The recording medium as claimed in claim 15, wherein said method further comprises decreasing a probability of the occurrence of the predetermined outcome per each individual event until the actual outcomes of at least the minimum number of events have been determined.

* * * * *